United States Patent
Gouverneur

(10) Patent No.: US 10,038,985 B2
(45) Date of Patent: Jul. 31, 2018

(54) COMMUNICATION METHOD BETWEEN AN EMBEDDED COMMUNICATION SYSTEM OF AN AIRCRAFT AND A COMMUNICATION DEVICE, AND COMMUNICATION MODULE, TERMINAL AND ASSEMBLY

(71) Applicant: DASSAULT AVIATION, Paris (FR)

(72) Inventor: Stéphane Gouverneur, Chaville (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 15/211,528

(22) Filed: Jul. 15, 2016

(65) Prior Publication Data

US 2017/0026809 A1   Jan. 26, 2017

(30) Foreign Application Priority Data

Jul. 23, 2015   (FR) ..................................... 15 01576

(51) Int. Cl.
*H04W 84/04*   (2009.01)
*H04W 88/02*   (2009.01)
(Continued)

(52) U.S. Cl.
CPC .......... *H04W 4/046* (2013.01); *H04L 61/605* (2013.01); *H04W 76/025* (2013.01);
(Continued)

(58) Field of Classification Search
CPC ............ H04B 7/18502; H04B 7/18504; H04B 7/18506; H04W 88/02; H04W 4/003;
(Continued)

(56) References Cited

U.S. PATENT DOCUMENTS

2005/0256616 A1* 11/2005 Rhoads ................... H04L 67/06
701/1
2007/0016344 A1* 1/2007 Stefani ................ H04L 65/1069
701/3
(Continued)

FOREIGN PATENT DOCUMENTS

EP   2 779 480 A2   9/2014

OTHER PUBLICATIONS

French Search Report of priority application dated May 13, 2016.

*Primary Examiner* — Philip Sobutka
(74) *Attorney, Agent, or Firm* — Davidson, Davidson & Kappel, LLC

(57) ABSTRACT

A communication method between an embedded communication system of an aircraft and a communication device is provided. The method includes a step for establishing a communication between the embedded communication system and the communication device, done according to a communication parameter associated with the communication device, contained in a memory of a communication terminal. The establishment step includes a phase for establishing a first auxiliary communication between terminal and the communication system, a phase for establishing a second auxiliary communication between the terminal and the communication device, according to the communication parameter, and a phase for transferring the second auxiliary communication from the terminal toward the communication system.

16 Claims, 2 Drawing Sheets

(51) Int. Cl.
*H04B 7/185* (2006.01)
*H04W 4/04* (2009.01)
*H04W 76/15* (2018.01)
*H04L 29/12* (2006.01)
*H04W 76/02* (2009.01)
*H04W 84/06* (2009.01)

(52) U.S. Cl.
CPC ............. *H04W 76/15* (2018.02); *H04B 7/185* (2013.01); *H04W 84/06* (2013.01); *H04W 88/02* (2013.01)

(58) Field of Classification Search
CPC ..... H04W 4/008; H04W 4/046; H04W 84/06; H04L 2012/4028; H04L 65/1069; H04M 7/006
USPC ................................................ 455/41.2, 431
See application file for complete search history.

(56) References Cited

U.S. PATENT DOCUMENTS

| | | | |
|---|---|---|---|
| 2007/0027589 A1* | 2/2007 | Brinkley | H04B 7/18506 701/3 |
| 2007/0042727 A1 | 2/2007 | Stefani | |
| 2015/0327307 A1* | 11/2015 | Randrianasolo | H04W 12/04 370/329 |
| 2016/0212618 A1* | 7/2016 | Henzl | H04W 4/008 |

\* cited by examiner

COMMUNICATION METHOD BETWEEN AN EMBEDDED COMMUNICATION SYSTEM OF AN AIRCRAFT AND A COMMUNICATION DEVICE, AND COMMUNICATION MODULE, TERMINAL AND ASSEMBLY

This claims the benefit of French Patent Application FR 15 01576, filed Jul. 23, 2015 and hereby incorporated by reference herein.

The present invention relates to a communication method between an embedded communication system of an aircraft and a communication device, said method comprising a step for establishing a communication between said embedded communication system and said communication device.

Such a method is intended to allow the crew of an aircraft to establish a communication, in particular by telephone, with communication devices, in particular telephone terminals, positioned outside the cockpit, in particular outside the aircraft.

BACKGROUND

In a known manner, aircraft cockpits are provided with an avionics communication system allowing an operator to establish, from the cockpit, a communication toward a communication device outside the aircraft or positioned in the aircraft, via a network access point embedded in the aircraft. Such a communication is initiated by the operator by selecting an identifier of the communication device associated with a parameter making it possible to establish a communication with the targeted device, for example a telephone number, from a directory stored in a memory of the avionics communication system, or by dialing that identifier on a user interface positioned in the cockpit.

The network access point also makes it possible to establish a communication from a communication terminal arranged in the aircraft toward a communication device outside the aircraft.

SUMMARY OF THE INVENTION

Nevertheless, the existing solutions do not allow any sharing of resources of the terminals positioned in the aircraft with the avionics communication system, and in particular do not allow an operator to access the directories of those terminals from the cockpit. These solutions therefore do not allow an operator to easily initiate a communication from equipment in the cockpit, for example the headset and microphone of the avionics system, toward a communication device whose identifier is stored in a memory of a terminal arranged inside the aircraft.

One aim of the invention is to provide a communication method and system facilitating the establishment of a communication between a communication device embedded in the aircraft and a communication device outside the aircraft, from communication parameters contained in a memory of equipment arranged in the aircraft.

To that end, the invention provides a method of the aforementioned type, characterized in that said step for establishing the communication between said embedded communication system and said communication device is done according to at least one communication parameter associated with said communication device, contained in a memory of a communication terminal, said establishment step comprising:

- a phase for establishing a first auxiliary communication between said communication terminal and said embedded communication system,
- a phase for establishing a second auxiliary communication between said communication terminal and said communication device, according to said communication parameter contained in the memory of said communication terminal,
- a phase for transferring said second auxiliary communication from said communication terminal toward said embedded communication system so as to establish said communication between said embedded communication system and said communication device.

The method according to the invention may comprise one or more of the following features, considered alone or according to any technically possible combinations:

- said communication device is arranged outside said aircraft;
- said communication terminal is a portable terminal, arranged inside the aircraft;
- the method comprises, before the phase for establishing said second auxiliary communication, an initiation phase comprising the selection by an operator of said communication parameter from among a plurality of communication parameters contained in said memory of said communication terminal;
- during said phase for establishing said second auxiliary communication, said second auxiliary communication is established according to said communication parameter selected by the operator;
- said communication parameter comprises an address of said communication device;
- said embedded communication system comprises a device for sending and receiving communications, embedded in the cockpit of the aircraft, said communication being established between said communication sending and receiving device and said communication device;
- said communication between said embedded communication system and said communication device is a telephone communication;
- said communication sending and receiving device is an avionics headset provided with a microphone.

The invention also provides a communication module configured to establish a communication between an embedded communication system of an aircraft and a communication device, according to at least one communication parameter associated with said communication device, contained in a memory of a communication terminal, said communication module being configured to:

- establish a first auxiliary communication between said auxiliary communication terminal and said embedded communication system,
- establish a second auxiliary communication between said communication terminal and said communication device, according to said communication parameter contained in the memory of said communication terminal,
- command transferring said second auxiliary communication from said communication terminal toward said embedded communication system so as to establish said communication between said embedded communication system and said communication device.

The invention also provides communication terminal, comprising:

- a memory comprising at least one communication parameter associated with a communication device, a communication module configured to establish a communication between an embedded communication system of an aircraft and said communication device, according to a communication parameter associated with said communication device,
said communication module being configured to:
establish a first auxiliary communication between said communication terminal and said embedded communication system,
establish a second auxiliary communication between said communication terminal and said communication device, according to said communication parameter contained in the memory of said communication terminal,
command transferring said second auxiliary communication from said communication terminal toward said embedded communication system so as to establish said communication between said embedded communication system and said communication device.

According to one embodiment, said memory comprises a plurality of communication parameters associated with at least two separate communication devices, and said terminal further comprises a man-machine interface suitable for allowing a selection by an operator of said communication parameter from among said plurality of communication parameters.

The invention also provides communication assembly, comprising:
an embedded communication system of an aircraft,
a communication terminal, comprising:
a memory comprising at least one communication parameter associated with a communication device,
a communication module configured to establish a communication between said embedded communication system and said communication device, according to a communication parameter associated with said communication device,
said communication module being configured to:
establish a first auxiliary communication between said communication terminal and said embedded communication system,
establish a second auxiliary communication between said communication terminal and said communication device, according to said communication parameter contained in the memory of said communication terminal,
command transferring said second auxiliary communication from said communication terminal toward said embedded communication system so as to establish said communication between said embedded communication system and said communication device.

The communication assembly according to the invention may comprise one or more of the following features, considered alone or according to any technically possible combinations:
the communication assembly further comprises a communication interface system embedded in the aircraft, said communication interface system being configured to receive a transfer command for said second auxiliary communication from said communication terminal toward said embedded communication system sent by said communication module, and to transfer said second auxiliary communication from said communication terminal toward said embedded communication system so as to establish said communication between said embedded communication system and said communication device when said communication interface system receives said transfer command;
said embedded communication system comprises a device for sending and receiving communications, embedded in the cockpit of the aircraft, and said communication module is configured to establish said communication between said communication sending and receiving device and said communication device.

BRIEF DESCRIPTION OF THE DRAWINGS

The invention will be better understood upon reading the following description, provided solely as an example and done in reference to the appended figures, in which.

DETAILED DESCRIPTION

Figure 1:
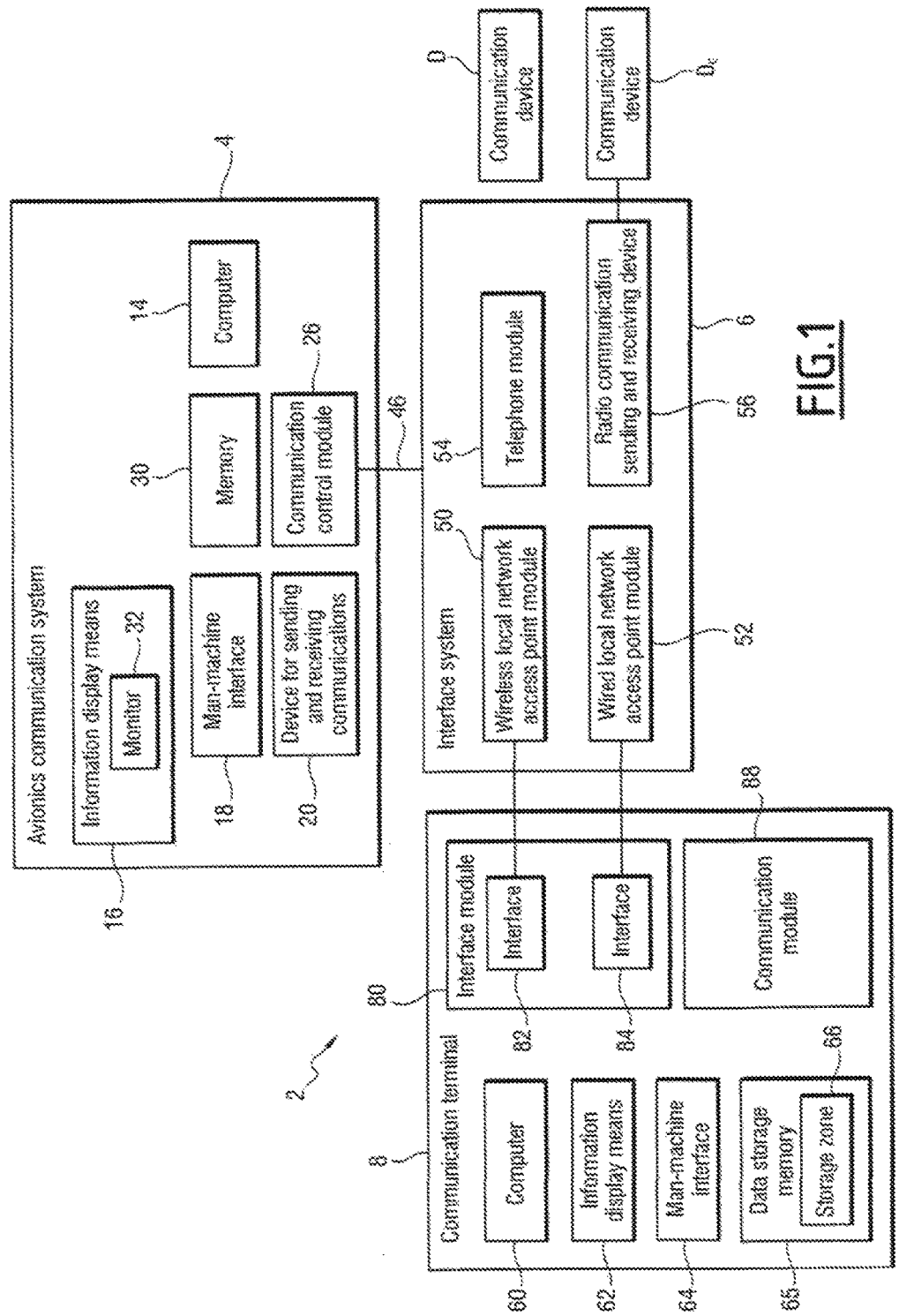
FIG. 1 is a diagrammatic view of a communication assembly according to one embodiment of the invention.

A communication assembly 2 according to one embodiment of the invention is illustrated in FIG. 1.

The communication assembly 2 comprises an avionics communication system 4, a communication interface system 6, and at least one communication terminal 8.

The avionics communication system 4 and the communication interface system 6 are embedded systems. "Embedded" refers to a system, device or piece of equipment that is part of the aircraft, in particular permanently connected to other pieces of equipment, devices or systems of the aircraft, as opposed to equipment only temporarily brought inside the aircraft.

A device or terminal outside the aircraft will refer to a device that is not embedded. Such an outside device or terminal may of course be introduced into an aircraft, without, however, being an embedded device or terminal.

The avionics communication system 4 is intended to be placed in the cockpit of the aircraft, in order to allow the crew of the aircraft, in particular a pilot, to communication with equipment outside the cockpit, for example the communication terminal 8 or communication devices D arranged outside the aircraft.

The communication devices D are devices able to exchange data, for example telephone terminals or tablets.

To that end, the communication system 4 comprises a computer 14, information display means 16, a man-machine interface 18, a device 20 for sending and receiving communications, for example an avionics headset with a microphone.

The communication system 4 also comprises a communication control module 26 and a memory 30.

The communication control module 26 is intended to be positioned inside the cockpit of the aircraft. The communication control module 26 is intended to allow an operator located in the cockpit to select a type of communication that he wishes to establish with an outside communication device, in order to establish this communication between the device 20 for sending and receiving communications, in particular the avionics headset, and the outside communication device.

The communication control module 26 is for example an audio control panel. Such an audio control panel comprises a plurality of buttons and/or switches making it possible to select the type of communication to be established between the avionics headset and the outside communication device. The type of communication is for example chosen from among ultra high frequency (UHF), very high frequency (VHF) or high frequency (HF) radio communications or satellite communications. In particular, the audio control panel allows an operator to select a satellite telephone communication.

The communication control module 26 is also configured to send communication signals, in particular audio, from and to the communication sending and receiving device 20.

The memory 30 comprises a database of communication parameters, each associated with an outside communication device D. The database of communication parameters in particular comprises a set of identifiers of communication devices, each associated with at least one communication parameter making it possible to establish a communication with the communication device D. The communication parameter(s) associated with a communication device in particular comprise an address of the communication device D, for example a telephone number. An address refers to an alphanumeric code making it possible to reach the communication device in order to establish a communication with this communication device.

The memory 30 is for example a computer memory 14 dedicated to storing a database of communication parameters.

The display means 16 comprise a display device, for example a monitor 32, and means for processing graphic information, for example a processor and an associated memory. The monitor 32 is for example a touchscreen. The monitor 32 is for example an avionics monitor, configured to display information relative to a flight of the aircraft.

The man-machine interface 18 is in particular intended to allow an operator, in particular a pilot, to interact with the avionics communication system 4, and more generally with the communication assembly 2. According to one embodiment, the man-machine interface 18 comprises a member for controlling a cursor displayed on the monitor 32 to activate selected zones of the monitor 32, for example buttons, and an alphanumeric keypad, designed in particular to enter information, in particular one or more identifiers of outside communication devices with which the operator wishes to establish a communication.

Alternatively or additionally, when the monitor 32 is a touchscreen, the man-machine interface 18 comprises means for detecting the position of one or more control members on the monitor 22. In a known manner, these control members can be activated via a contact, for example via a stylus, the fingers of an operator, or without contact, through any other means of detecting a human interaction.

Alternatively or additionally, the man-machine interface 18 comprises a physical alphanumeric keypad, designed in particular to enter information, in particular one or more identifiers of outside communication devices with which the operator wishes to establish a communication.

Furthermore, the display means 16 are suitable for displaying, on the monitor 32, information stored in the memory 30, in particular communication device identifiers D stored in that memory, in order for an operator to select an identifier using the man-machine interface 18, and establish a communication with the communication device D associated with that identifier.

The avionics communication system 4 is thus suitable for allowing an operator, in particular a pilot, to initiate a communication with a communication device D outside the aircraft, by selecting the appropriate type of communication, for example a telephone communication, on the communication control module 26 and selecting the identifier of a communication device Dc chosen using the man-machine interface 18, for example by selecting, via the man-machine interface 18, that identifier from among the identifiers stored in the memory 30 and displayed on the monitor 32.

This capacity of the avionics communication system 4, not directly related to the implementation of the method, is mentioned for complete illustration purposes of the assembly.

The communication interface system 6 is configured to allow an exchange of communication signals between the avionics communication system 4 and an outside communication device D, which can be located in the aircraft or arranged outside the aircraft. The interface system 6 is thus connected to the avionics communication system 4 by a data link 46, preferably wired, allowing the exchange of communication data between the interface system 6 and the avionics communication system 4, in particular between the communication control module 26 and the interface system 6.

The interface system 6 includes several interface modules allowing the exchange of data according to several communication standards.

In particular, the interface system 6 includes a wireless local network access point module 50 of the WLAN type, for example a Wi-Fi access point, in particular according to standard IEEE 802.11g. The wireless local network access point module 50 is configured to exchange, i.e., receive and/or send, wireless communication signals, with one or more terminals arranged within range, for example outside terminals arranged in the aircraft, in particular the communication terminal 8.

The interface system 6 also includes a wired local network access point module 52 of the LAN type, for example an Ethernet access point. The wired local network access point module 50 is configured to exchange communication signals with one or more terminals that are connected to it by a wired connection, for example outside terminals arranged in the aircraft, in particular the communication terminal 8.

The interface system 6 also includes a telephone module 54, hereinafter called telephone server 54, configured to allow the establishment of a telephone communication. In particular, the telephone server 54 is configured to allow the establishment of a telephone communication between the avionics communication system 4, in particular the communication sending and receiving device 20, and a communication terminal or device D positioned in the aircraft or outside the aircraft.

The interface system 6 further includes a radio communication sending and receiving device 56, suitable for exchanging communication signals with outside communication devices D, in particular according to the type of communication selected by the operator using the communication control module 26. In particular, the radio communication sending and receiving device 56 is configured to exchange communication signals with outside communication devices D via a satellite network.

The communication terminal 8 is for example portable equipment arranged inside the aircraft, in particular in the cockpit, particularly during a flight of the aircraft, but not embedded in the aircraft. As an example, the communication terminal 8 is a telephone terminal such as a mobile telephone, a smartphone, a tablet, or a terminal of the "electronic flight bag" (EFB) type.

The communication terminal 8 in particular comprises a computer 60, information display means 62 and a man-machine interface 64.

The display means 62 comprise a display device, for example a monitor, in particular touch-sensitive, and means for processing graphic information, for example a processor and an associated memory.

The man-machine interface 64 is intended to allow an operator, in particular a pilot, to interact with the communication terminal 8.

The communication terminal 8 is further provided with a data storage memory 65, including a storage zone 66, subsequently called directory, comprising a set of identifiers of communication devices D, each associated with at least one communication parameter making it possible to establish a communication with the communication device. The communication parameter(s) associated with a communication device D in particular comprise an address of the communication device D, for example a telephone number.

The communication terminal 8 is configured to exchange communication data with the avionics communication system 4 and with communication devices that are not embedded, via the interface system 6.

To that end, the terminal 8 is provided with an interface module 80, configured to allow an exchange of communication data between the terminal 8 and the avionics communication system 4 or with communication devices that are not embedded. The interface module 80 for example includes an interface 82 of the WLAN type using the same technology as the wireless local network access point module 50, and/or a LAN-type interface 84 using the same technology as the wired local network access point module 52.

The terminal 8 further comprises a communicator in the form of a communication module 88, configured to establish a communication, in particular by telephone, between the terminal 8 and a communication device D, in particular a communication device whose identifier is stored in the directory 66, via the interface module 80.

For example, the communication module 88 is configured to establish such a communication in response to an action by an operator, for example the pilot, via the man-machine interface 64. Such an action for example comprises selecting an identifier of a selected communication device, denoted Dc, with which the operator would like a communication to be established.

The communication module 88 is thus suitable for establishing a communication between the avionics communication system 4, in particular the avionics headset, and the communication device Dc whose identifier was selected by the operator, from at least one communication parameter, originating from the storage zone 66, associated with the communication device Dc.

To that end, the communication module 88 is configured to establish a first auxiliary communication device with the avionics communication system 4, in particular with the communication sending and receiving device 20, for example the avionics headset. The first auxiliary communication is a communication established between the terminal 8 and the avionics communication system 4, via the communication interface system 6.

The communication module 88 is further configured to establish a second auxiliary communication with the communication device Dc whose identifier has been selected by the operator, from the communication parameter associated with that identifier in the directory 66. The second auxiliary communication is thus a communication established between the terminal 8 and the selected communication device Dc, via the communication interface system 6. If the communication device Dc is situated outside the aircraft, the second auxiliary communication is established using the radio communication sending and receiving device 56, for example via a satellite network.

When the first and second auxiliary communications are established, the communication module 88 is configured to transfer the second auxiliary communication from the terminal 8 toward the avionics communication system 4, in particular toward the communication sending and receiving device 20, so as to establish a communication between the avionics communication system 4 and the selected communication device Dc.

For example, to perform such a transfer, the communication module 88 is suitable for sending a command signal to the communication interface system 6 so that the communication established between the terminal 8 and the selected communication device is no longer routed toward the terminal 8, but toward the avionics communication system 4.

The communication between the avionics communication system 4 and the communication device Dc chosen by the operator is established via the communication interface system 6, and, if the communication device Dc is situated outside the aircraft, using the radio communication sending and receiving device 56, for example via a satellite network.

In one embodiment of the invention, the first and second auxiliary communications, as well as the communication between the avionics communication system 4 and the communication device Dc chosen by the operator, are telephone communications.

According to this embodiment, the communication module 88 makes it possible to establish a telephone communication between the avionics headset and the communication device Dc from the telephone number of the communication device Dc stored in the directory 66 of the terminal 8. The communication module 88 thus allows an operator to call, from the avionics equipment of the aircraft, telephone terminals whose telephone number is not entered in the avionics system of the aircraft, without having to enter that telephone number manually.

The communication module 88 is further configured to allow access to the storage memory 65 of the terminal 8 by an operator from the avionics communication system 4. In particular, such access allows an operator to record data in the memory 65, for example audio data generated from the cockpit of the aircraft using the device 20, in particular the microphone of the device 20.

To that end, the communication module 88 is configured to establish a communication device with the avionics communication system 4, in particular with the communication sending and receiving device 20, for example the avionics headset. Once this communication is established, the communication module 88 is configured to command the recording in the storage memory 65 of data sent by the avionics communication system 4 via this communication. In particular, the communication module 88 is configured to command the storage, in the memory 65, of audio data generated from the cockpit of the aircraft using the device 20, in particular the microphone of the device 20.

The communication module 88 is further configured to allow a command of the terminal 8 by an operator from the avionics communication system 4. Such access allows an operator to command the terminal 8, for example using voice commands, from the cockpit of the aircraft.

To that end, the communication module 88 is configured to establish a communication device with the avionics communication system 4, in particular with the communication sending and receiving device 20, for example the avionics headset. Once this communication is established, the communication module 88 is configured to send the data received from the avionics communication system via this communication to an appropriate module of the terminal 8, for example to a module interpreting voice commands. According to one example embodiment of the invention, the communication module 88 is made in the form of a software program stored in the memory 65 of the terminal 8 and able to be executed by the computer 60. Alternatively, the communication module 88 is at least partially made in the form of programmable logic components, or in the form of dedicated integrated circuits, included in the terminal 8.

Figure 2:
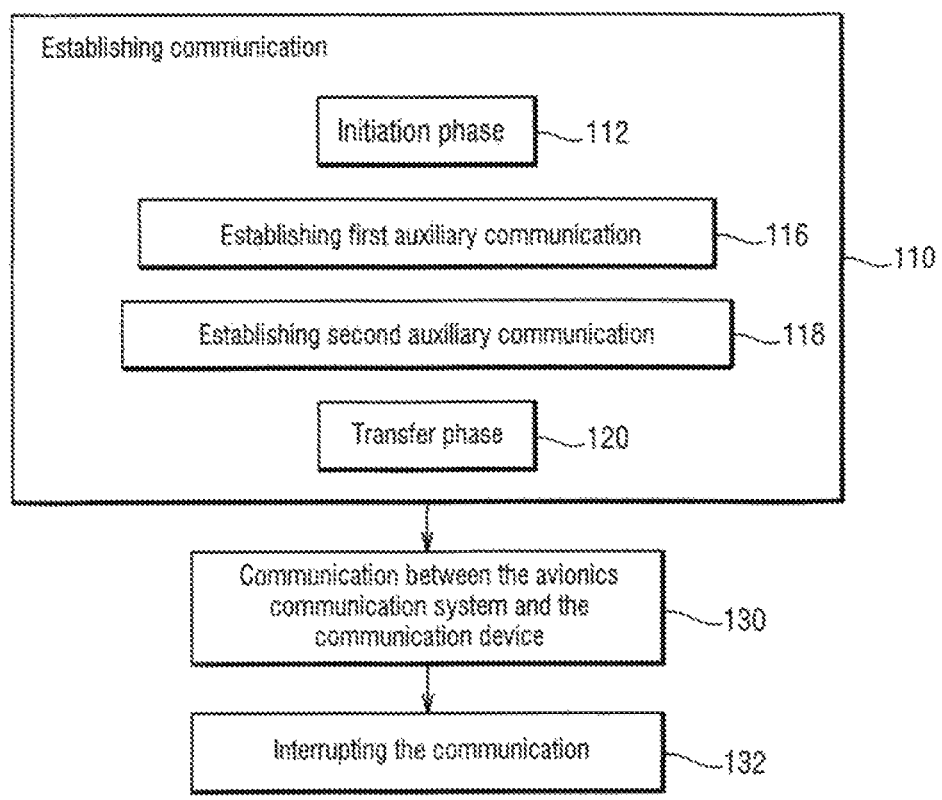
FIG. 2 is a block diagram illustrating the implementation of a method according to one embodiment of the invention.

One example embodiment of a communication method between the avionics communication system 4 and a communication device outside the aircraft according to one embodiment of the invention will now be described in reference to FIG. 2.

The method includes a step 110 for establishing a communication between the avionics communication system 4 and the communication device Dc situated outside the aircraft, according to at least one communication parameter contained in the directory 66 of the terminal 8.

As described above, the communication parameter is for example an address of the communication device, in particular a telephone number making it possible to establish a telephone communication with the communication device.

The step 110 for establishing the communication between the avionics communication system 4 and the communication device Dc comprises a phase 112 for initiation by an operator of this communication, during which the operator commands the terminal 8 to establish this communication.

This initiation phase 112 for example comprises the selection, by the operator, using the man-machine interface 64 of the terminal 8, of the identifier of the communication device Dc with which the operator wishes for a communication to be established. The identifier is for example chosen from among the identifiers of the communication devices D stored in the directory 66 and displayed on the display means 62 of the terminal 8.

The initiation phase 112 is preferably implemented in the cockpit of the aircraft, for example by a pilot provided with the communication sending and receiving device 20, for example an avionics headset provided with a microphone.

The initiation phase 112 is followed by a phase 116 for establishing a first auxiliary communication between the terminal 8 and the avionics communication system 4. This phase 116 is initiated by the terminal 8, in particular by the communication module 88 of the terminal 8.

The first auxiliary communication is established between the terminal 8 and the communication sending and receiving device 20, via the interface system 6. The first auxiliary communication allows an exchange of data between the terminal 8 and the communication sending and receiving device 20, this data passing through a link established between the interface module 80 and the interface system 6, and via the link between the interface system 6 and the communication control module 26.

For example, the first auxiliary communication is a telephone communication. The phase 116 for establishing the first auxiliary communication then for example comprises a call by the terminal 8 of the communication sending and receiving device 20, and an acceptance of that call by the operator, in particular using a communication control module 26.

The phase 116 is followed by a phase 118 for establishing a second auxiliary communication between the terminal 8 and the communication device Dc selected during the initiation phase 112. This second auxiliary communication is established by the terminal 8, in particular by the communication module 88 of the terminal 8, using the communication parameter associated with the identifier of the communication device Dc in the directory 66.

For example, the second auxiliary communication is a telephone communication, and the phase 118 for establishing the second auxiliary communication comprises a call by the communication module 88 of the telephone number associated with the communication device Dc in the directory 66.

If the communication device Dc is situated outside the aircraft, the second auxiliary communication is established using the radio communication sending and receiving device 56, for example via a satellite network.

Then, once the first and second auxiliary communications are established, the terminal 8, in particular the communication module 88, implements a phase 120 for transferring the second auxiliary communication from the terminal 8 toward the avionics communication system 4, in particular toward the communication sending and receiving device 20, so as to establish the communication between the avionics communication system 4 and the communication device Dc selected by the operator.

For example, to perform such a transfer, the communication module 88 sends, during the transfer phase 120, a command signal to the communication interface system 6 so that the second auxiliary communication, established between the terminal 8 and the selected communication device Dc, is transferred toward the avionics communication system 4.

The communication between the avionics communication system 4 and the communication device Dc chosen by the operator during the initiation phase 112 is established via the communication interface system 6, and, if the communication device Dc is situated outside the aircraft, using the radio communication sending and receiving device 56, for example via a satellite network. In particular, this communication allows an exchange of data between the sending device 20 and the chosen communication device, this data passing through the data link 46 between the communication control module 26 and the communication interface system 6.

For example, the communication established during the phase 120 between the avionics communication system 4 and the chosen communication device Dc is a telephone communication.

The step 110 for establishing communication between the avionics communication system 4 and the chosen communication device Dc is then followed by a step 130 for communication between the avionics communication system 4 and the communication device Dc, then a step 132 for interrupting the communication between the avionics communication system 4 and the communication device.

The communication method thus allows a pilot to communicate, using avionics equipment arranged in the cockpit of the aircraft, with communication devices whose communication parameters, in particular an address such as a telephone number, are not entered in a memory of the avionics communication system but are available on another terminal, without having to enter that address manually.

As described above, the communication module 88 is configured to allow access to the storage memory 65 of the terminal 8 by an operator from the avionics communication system 4.

To that end, during a first step, the communication module 88 establishes a communication device with the avionics communication system 4, in particular with the communication sending and receiving device 20, for example the avionics headset.

Then, when this communication is established, the communication module 88 commands the recording in the storage memory 65 of data sent by the avionics communication system via this communication. In particular, if it involves a telephone communication, the communication module 88 commands the storage, in the memory 65, of audio data generated from the cockpit of the aircraft using the device 20, in particular the microphone of the device 20.

Furthermore, as described above, the communication module 88 is configured to allow a command of the terminal 8 by an operator from the avionics communication system 4.

To that end, during a first step, the communication module 88 establishes a communication device with the avionics communication system 4, in particular with the communication sending and receiving device 20, for example the avionics headset. Then, during a second step implemented once this communication is established, the communication module 88 sends the data received from the avionics communication system 4 via this communication to an appropriate module of the terminal 8, for example to a module interpreting voice commands. This module then interprets this data so as to extract a command, and the terminal 8 executes that command.

It must be understood that the example embodiments described above are not limiting.

In particular, the first auxiliary communication can be established before or after the second auxiliary communication.

The communication established between the avionics communication system 4 and the communication device is not necessarily a telephone communication, but can be an audiovisual communication, or a textual data communication.

Furthermore, it will be understood that a communication between a first terminal, system or device and a second terminal, system or device is not necessarily established by the first terminal, system or device, but can be established by the second terminal, system or device, and therefore indifferently designates a communication established from the first toward the second terminal, system or device or from the second toward the first terminal, system or device.

Thus, according to one alternative of the described embodiment, the first auxiliary communication, established between the terminal 8 and the avionics communication system 4, is not initiated by the communication module 88, but by the avionics communication system, in particular by the communication control module 26.

What is claimed is:

1. A communication method between an embedded communication system of an aircraft and a communication device, the method comprising:
    establishing a communication between the embedded communication system and the communication device, the establishing of the communication between the embedded communication system and the communication device being done according to at least one communication parameter associated with the communication device, contained in a memory of a communication terminal distinct from the communication device, the establishing of the communication comprising:
        establishing a first auxiliary communication between the communication terminal and the embedded communication system;
        establishing a second auxiliary communication between the communication terminal and the communication device, according to the communication parameter contained in the memory of the communication terminal; and
        transferring the second auxiliary communication from the communication terminal toward the embedded communication system so as to establish the communication between the embedded communication system and the communication device,
    the first auxiliary communication being established between the communication terminal and the embedded communication system, via an interface system, through a first link connecting the communication terminal to the interface system and through a second link connecting the interface system to the embedded communication system, and the second auxiliary communication being established between the communication terminal and the communication device, via the interface system, through the first link connecting the communication terminal to the interface system, and through a third link connecting the interface system to the communication device, the third link being disjoint from the second link,
    the interface system being distinct from the embedded communication system, the communication device and the communication terminal, the communication device being arranged outside the aircraft, the communication terminal being a portable terminal, arranged inside the aircraft,
    the embedded communication system communicating with the communication device via the interface system, through the second link connecting the embedded communication system to the interface system and through the third link connecting the interface system to the communication device.

2. The method according to claim 1, the establishing of the communication further comprises, before the establishing of the second auxiliary communication, an initiation phase comprising a selection by an operator of the communication parameter from among a plurality of communication parameters contained in the memory of the communication terminal.

3. The method according to claim 2, wherein during the establishing of the second auxiliary communication, the second auxiliary communication is established according to the communication parameter selected by the operator.

4. The method according to claim 1, wherein the communication parameter comprises an address of the communication device.

5. The method according to claim 1, wherein the embedded communication system comprises a communication sending and receiving device, embedded in the cockpit of the aircraft, the communication being established between the communication sending and receiving device and the communication device.

6. The method according to claim 5, wherein the communication between the embedded communication system and the communication device is a telephone communication, and wherein the communication sending and receiving device is an avionics headset provided with a microphone.

7. The method according to claim 1, wherein the communication between the embedded communication system and the communication device is a telephone communication.

8. The method according to claim 1, wherein during the transferring of the second auxiliary communication, the communication terminal sends a command signal to the interface system so that the second auxiliary communication is no longer routed toward the communication terminal, but toward the embedded communication system.

9. The method according to claim 1, wherein the first auxiliary communication is a telephone communication, and the establishing of the first auxiliary communication comprises a call, by the communication terminal, of the embedded communication system.

10. The method according to claim 1, wherein during the transfer phase, the second auxiliary communication between the communication terminal and the communication device is interrupted.

11. A communication module configured to establish a communication between an embedded communication system of an aircraft and a communication device, according to at least one communication parameter associated with the communication device, contained in a memory of a communication terminal distinct from the communication device, the communication module being configured to:
   establish a first auxiliary communication between the auxiliary communication terminal and the embedded communication system;
   establish a second auxiliary communication between the communication terminal and the communication device, according to the communication parameter contained in the memory of the communication terminal; and
   command a transfer of the second auxiliary communication from the communication terminal toward the embedded communication system so as to establish the communication between the embedded communication system and the communication device,
   the first auxiliary communication being established between the communication terminal and the embedded communication system, via an interface system, through a first link connecting the communication terminal to the interface system and through a second link connecting the interface system to the embedded communication system, and the second auxiliary communication being established between the communication terminal and the communication device, via the interface system, through the first link connecting the communication terminal to the interface system, and through a third link connecting the interface system to the communication device, the third link being disjoint from the second link,
   the interface system being distinct from the embedded communication system, the communication device and the communication terminal, the communication device being arranged outside the aircraft, the communication terminal being a portable terminal, arranged inside the aircraft,
   the embedded communication system communicating with the communication device via the interface system, through the second link connecting the embedded communication system to the interface system and through the third link connecting the interface system to the communication device.

12. A communication terminal comprising:
   a memory comprising at least one communication parameter associated with a communication device, the communication terminal being distinct from the communication device;
   a communicator configured to establish a communication between an embedded communication system of an aircraft and the communication device, according to a communication parameter associated with the communication device, the communicator being configured to:
      establish a first auxiliary communication between the communication terminal and the embedded communication system;
      establish a second auxiliary communication between the communication terminal and the communication device, according to the communication parameter contained in the memory of the communication terminal; and
      command a transfer of the second auxiliary communication from the communication terminal toward the embedded communication system so as to establish the communication between the embedded communication system and the communication device,
   the first auxiliary communication being established between the communication terminal and the embedded communication system, via an interface system, through a first link connecting the communication terminal to the interface system and through a second link connecting the interface system to the embedded communication system, and the second auxiliary communication being established between the communication terminal and the communication device, via the interface system, through the first link connecting the communication terminal to the interface system, and through a third link connecting the interface system to the communication device, the third link being disjoint from the second link,
   the interface system being distinct from the embedded communication system, the communication device and the communication terminal, the communication device being arranged outside the aircraft, the communication terminal being a portable terminal, arranged inside the aircraft,
   the embedded communication system communicating with the communication device via the interface system, through the second link connecting the embedded communication system to the interface system and through the third link connecting the interface system to the communication device.

13. The communication terminal according to claim 12, wherein the memory comprises a plurality of communication parameters associated with at least two separate communication devices, and the terminal further comprises a man-machine interface configured to allow a selection by an operator of the communication parameter from among the plurality of communication parameters.

14. A communication assembly comprising:
   an embedded communication system of an aircraft; and
   a communication terminal comprising:
      a memory comprising at least one communication parameter associated with a communication device, the communication terminal being distinct from the communication device; and
      a communicator configured to establish a communication between the embedded communication system and the communication device, according to a communication parameter associated with the communication device, the communicator being configured to:
         establish a first auxiliary communication between the communication terminal and the embedded communication system;
         establish a second auxiliary communication between the communication terminal and the communication device, according to the communication parameter contained in the memory of the communication terminal; and command a transfer of the second auxiliary communication from the communication terminal toward the embedded communication system so as to establish the communication between the embedded communication system and the communication device, the first auxiliary communication being established between the communication terminal and the embedded communication system, via an interface system, through a first link connecting the communication terminal to the interface system and through a second link connecting the interface system to the embedded communication system, and the second auxiliary communication being established between the communication terminal and the communication device, via the interface system, through the first link connecting the communication terminal to the interface system, and through a third link connecting the interface system to the communication device, the third link being disjoint from the second link, the interface system being distinct from the embedded communication system, the communication device and the communication terminal, the communication device being arranged outside the aircraft, the communication terminal being a portable terminal, arranged inside the aircraft, the embedded communication system communicating with the communication device via the interface system, through the second link connecting the embedded communication system to the interface system and through the third link connecting the interface system to the communication device.

15. The communication assembly according to claim 14 further comprising a communication interface system embedded in the aircraft, the communication interface system being configured to receive a transfer command for the second auxiliary communication from the communication terminal toward the embedded communication system, sent by the communicator, and to transfer the second auxiliary communication from the communication terminal toward the embedded communication system so as to establish the communication between the embedded communication system and the communication device when s the communication interface system receives the transfer command.

16. The communication assembly according to claim 14, wherein the embedded communication system comprises a communication sending and receiving device, embedded in the cockpit of the aircraft, and the communicator is configured to establish the communication between the communication sending and receiving device and the communication device.

* * * * *